United States Patent
David et al.

(10) Patent No.: US 11,509,666 B2
(45) Date of Patent: Nov. 22, 2022

(54) AUTOMATED SECURITY POLICY GENERATION FOR CONTROLLERS

(71) Applicant: Karamba Security Ltd., Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

(21) Appl. No.: 17/073,470

(22) Filed: Oct. 19, 2020

(65) Prior Publication Data

US 2021/0105288 A1 Apr. 8, 2021

Related U.S. Application Data

(63) Continuation of application No. 16/285,340, filed on Feb. 26, 2019, now Pat. No. 10,819,715, which is a
(Continued)

(51) Int. Cl.
*H04L 29/06* (2006.01)
*H04L 9/40* (2022.01)
(Continued)

(52) U.S. Cl.
CPC ............ *H04L 63/1408* (2013.01); *G06F 8/40* (2013.01); *G06F 21/125* (2013.01); *G06F 21/54* (2013.01);
(Continued)

(58) Field of Classification Search
CPC .......... G06F 8/40; G06F 21/125; G06F 21/54; H04L 9/00; H04L 63/0428
See application file for complete search history.

(56) References Cited

U.S. PATENT DOCUMENTS

| 8,090,816 B1 | 1/2012 | Deshmukh et al. |
| 8,463,888 B1 | 6/2013 | Boyer et al. |

(Continued)

FOREIGN PATENT DOCUMENTS

| EP | 2892199 | 7/2015 |
| WO | WO 2013/063474 | 5/2013 |
| WO | WO 2016/046819 | 3/2016 |

OTHER PUBLICATIONS

Yu et al., "Automobile ECU Design to Avoid Data Tampering", CISR '15: Proceedings of the 10th Annual Cyber and Information Security Research Conference, Apr. 2015.*
(Continued)

*Primary Examiner* — Morshed Mehedi
(74) *Attorney, Agent, or Firm* — Finnegan, Henderson, Farabow, Garrett & Dunner LLP (57) ABSTRACT

In one implementation, a method for automatically generating a security policy for a controller includes receiving, by a security policy generation system and from a controller development environment, code for a device controller; selecting middleware that enforces a security policy; analyzing the code for the device controller; based at least in part on the analyzing, automatically generating the security policy; and providing the selected middleware along with the generated security policy.

20 Claims, 7 Drawing Sheets

Related U.S. Application Data continuation of application No. 16/012,506, filed on Jun. 19, 2018, now Pat. No. 10,270,786, which is a continuation of application No. 15/480,052, filed on Apr. 5, 2017, now abandoned.

(60) Provisional application No. 62/346,896, filed on Jun. 7, 2016, provisional application No. 62/319,178, filed on Apr. 6, 2016.

(51) Int. Cl.
| | | |
|---|---|---|
| *G06F 21/12* | (2013.01) | |
| *G06F 21/54* | (2013.01) | |
| *G06F 8/40* | (2018.01) | |
| *H04L 9/32* | (2006.01) | |
| *H04L 9/00* | (2022.01) | |
| *G06F 8/30* | (2018.01) | |

(52) U.S. Cl.
CPC .............. *H04L 9/00* (2013.01); *H04L 9/3239* (2013.01); *H04L 63/0428* (2013.01); *H04L 63/101* (2013.01); *H04L 63/20* (2013.01); *G06F 8/30* (2013.01); *H04L 2209/84* (2013.01)

(56) References Cited

U.S. PATENT DOCUMENTS

| | | | |
|---|---|---|---|
| 8,555,385 B1 | 10/2013 | Bhatkar et al. | |
| 2004/0216150 A1* | 10/2004 | Scheifler | G06F 21/57 |
| | | | 719/330 |
| 2005/0182958 A1* | 8/2005 | Pham | G06F 21/53 |
| | | | 726/22 |
| 2005/0262503 A1* | 11/2005 | Kane | G06F 8/61 |
| | | | 717/176 |
| 2008/0120592 A1 | 5/2008 | Tanguay et al. | |
| 2008/0201178 A1 | 8/2008 | Vizitei | |
| 2008/0209016 A1* | 8/2008 | Karve | G06F 9/5077 |
| | | | 709/221 |
| 2009/0140864 A1 | 6/2009 | Aaron et al. | |
| 2010/0097242 A1 | 4/2010 | Bang et al. | |
| 2010/0251328 A1 | 9/2010 | Syed et al. | |
| 2011/0083186 A1 | 4/2011 | Niemela et al. | |
| 2011/0320525 A1 | 12/2011 | Agarwal et al. | |
| 2013/0086625 A1* | 4/2013 | Driscoll | G06F 8/40 |
| | | | 726/1 |
| 2013/0097660 A1 | 4/2013 | Das et al. | |
| 2013/0097708 A1 | 4/2013 | Jayanthi et al. | |
| 2013/0212659 A1* | 8/2013 | Maher | G05D 1/0022 |
| | | | 726/6 |
| 2014/0136710 A1 | 5/2014 | Bernari et al. | |
| 2014/0201323 A1 | 7/2014 | Fall et al. | |
| 2015/0046979 A1 | 2/2015 | Wu et al. | |
| 2015/0150124 A1 | 5/2015 | Zhang et al. | |
| 2015/0234577 A1 | 8/2015 | Jung | |

OTHER PUBLICATIONS

International Search Report and Written Opinion in International Application No. PCT/IB2017/051964, dated Jun. 26, 2017, 19 pages.

International Search Report and Written Opinion in International Application No. PCT/IB2017/051965, dated Aug. 18, 2017, 20 pages.

International Search Report and Written Opinion in International Application No. PCT/IB2017/051967, dated Jun. 12, 2017, 17 pages.

Anonymous, "Method for Protecting Code from Running in Unlicensed Environments", IP. Comm Journal, Jun. 17, 2014, 1-2.

International Search Report and Written Opinion in International Application No. PCT/IB2017/051959, dated Jun. 19, 2017, 22 pages.

Nieves et al., "UPnP into a car-gateway middleware with OSGi: Interoperability and security", 2009 Seventh Workshop on Intelligent solutions in Embedded Systems, Date of Conference: Jun. 25-26, 2009.

Badr et al., "Policy-based autonomic control service", Proceedings. Fifth IEEE International Workshop on Policies for Distributed Systems and Networks, Date of Conference: 9-9 Jun. 2004.

\* cited by examiner

AUTOMATED SECURITY POLICY GENERATION FOR CONTROLLERS

CLAIM OF PRIORITY

This application is a continuation of U.S. patent application Ser. No. 16/285,340, filed on Feb. 26, 2019, which issued as U.S. Pat. No. 10,819,715 on Oct. 27, 2020, which is a continuation of U.S. patent application Ser. No. 16/012,506, filed on Jun. 19, 2018, which issued as U.S. Pat. No. 10,270,786 on Apr. 23, 2019, which is a continuation of U.S. patent application Ser. No. 15/480,052, filed on Apr. 5, 2017, which claims priority to U.S. Provisional Application No. 62/346,896, filed on Jun. 7, 2016, and U.S. Provisional Application No. 62/319,178, filed on Apr. 6, 2016. The disclosures of the above-referenced applications are expressly incorporated herein by reference in their entireties.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber-attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber-attacks come in many forms and flavors, but they generally share the same basic concepts: find a preexisting security bug (vulnerability) in the system's software, exploit it, and run malware. A common security bugs is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be automatically generated and added to controllers with security layers without having to modify the underlying controller software. Such security policies and layers be implemented on controllers to ensure that only valid code and valid behaviors are allowed to run on the controllers, which can maintain secure operation and prevent the attacks from ever infiltrating the IoT device's infrastructure, such as a car's Controller Area Network (CAN Bus).

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Endpoint security layers can stop attacks on controller by blocking hackers at the gate—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

This document describes four general aspects. First, automatic security policy generation which includes automatically generating custom security policies that can be implemented on controllers without manual design. Second, secure controller operation and malware prevention using custom security policies that have been incorporated into controllers. Third, securely logging and reporting information on controller operation, such as the current status of a controller and blocked malware attempts, back to a central management computer system in real time without affecting controller performance/operation. Fourth, providing a centralized computer system to aggregate information from multiple devices using the same controllers, to provide for global device/controller views and analytics, including identifying and detecting anomalous controller operation.

While this document describes all four of these aspects, this document focuses on automatic custom security policy generation for controllers. As described below, these features include generating a custom security policy for a controller automatically and without the need for user intervention/designation of the features that should be included in the security policy. Additionally, security policies can be generated so as to be separate from and not need modification of the underlying controller software. Other features are also described throughout this document.

In one implementation, a method for automatically generating a security policy for a controller includes receiving, by a security policy generation system and from a controller development environment, code for a device controller; selecting middleware that enforces a security policy; analyzing the code for the device controller; based at least in part on the analyzing, automatically generating the security policy; and providing the selected middleware along with the generated security policy.

Such a method can optionally include one or more of the following features, which can be combined in each possible sub-combination of features. The method can further include identifying an operating system kernel configured to execute the code for the device controller, wherein the middleware for enforcing the security policy is selected based on its compatibility with the identified operating system kernel. The middleware for enforcing the security policy can include a process verification service, a watchdog service, and at least one anti-tampering agent configured to monitor the security policy and the watchdog service. Analyzing the code for the device controller can include static analysis. The security policy can be included in an encrypted, read-only file. Automatically generating the security policy can include generating a signature for each process of the code for the device controller, and adding the signature to a whitelist portion of the security policy. Automatically generating the security policy can include generating a process graph that identifies valid execution paths within the code for the device controller, and adding the process graph to the security policy. Automatically generating the security policy can include adding to the security policy, context information for at least one process of the code for the device controller. The code for the device controller can remain unmodified, and can remain distinct from the security policy and the middleware that enforces the security policy. The method can further include generating a secured device controller that includes the code for the device controller, the security policy, and the middleware that enforces the security policy.

In another implementation, a method for automatically generating a security policy for an externally connected automotive controller can include integrating, on a computer system, code for automatically generating a security policy into a build environment for controller software for the automotive controller; accessing, by the code, a build of the controller software for the automotive controller; automatically generating, by the code, the security policy based on analysis of the build for the controller software; and patching, by the code, the build with a middleware security layer that is programmed to use the security policy when the controller software is executing on the automotive controller.

In another implementation, a method for automatically generating a security policy for an externally connected automotive controller can include integrating, on a computer system, code for automatically generating a security policy into a build environment for controller software for the automotive controller; accessing, by the code, a build of the controller software for the automotive controller; disassembling, by the code, the build to identify processes that are part of the controller software; performing, by the code, static analysis on the processes to generate the security policy; and patching, by the code, the build with a middleware security layer that is programmed to use the security policy when the controller software is executing on the automotive controller.

Certain implementations can provide one or more of the following advantages. For example, endpoint controller security can us an operating system (OS) agnostic security agent and is built with an OS-specific middleware and a general purpose security agent. Such a security agent can be deployed in externally connected controllers to perform a variety of security-related functions, such as enforcing automatically generated security policies, collecting forensics information and upload it to the cloud, and/or providing anti-tampering features to prohibit hackers from circumventing the security agents. Such OS-agnostic agents can allow for endpoint security to be readily configured and deployed across a wide variety of vehicle controllers and OS environments.

In another example, the system can be integrated with the OEM/manufacturer build environment for controllers to automatically generate security agents and policies that are specific to the controllers, which can then be deployed to harden controllers and prevent security breaches. For instance, a client (or other software application/module) integrated into a build environment for a controller can scan the code and the binary for the controller, and automatically generate a security policy that is specific to the controller. Such scanning and automatic generation can include, for example, using static analysis tools and techniques to identify the universe of permitted processes, binaries, scripts, network usage, and/or other controller behaviors that are used to generate a customized security policy for the controller. Such as security policy can include, for example, a whitelist (e.g., identification of permitted processes, binaries, functions, operations), network firewall (e.g., identification of permitted network ports, IP addresses), functional graph (e.g., mapping and/or sequence of functions performed by a controller), and/or additional features that model permitted/designed behavior of the controller. Such automatic security policy generation (e.g., during build, due to static analysis (and other tools, such as simply signing on binaries to add to a whitelist)) can permit for endpoint security to be added to controllers with little to no effort on behalf of controller manufacturers/vendors, who can simply run the automated security policy generator prior to deployment in order to add endpoint security to their controller.

In a further example, a server system (e.g., cloud-base system) can be used to manage and monitor controllers that are hardened with endpoint security. Such as server system can processes and generate reports regarding controllers, such as information on detected and blocked malware, the current state of controllers in a vehicle, and/or other relevant information. Such reports can be at any of a variety of levels of granularity, from vehicle-specific views to manufacturer-specific views to the industry-wide views, which can be based on aggregated and anonymized user/vehicle/manufacturer information. For instance, a server system can collect forensics information in order to display incident reports based on malware detection, to calculate anomaly detection, to display current state of cars on the roads, to provide a management console in order to enhance policies (in production and during build—i.e. the cloud system is also connected to the project while it's being developed), and/or other relevant features. Such features can allow for manufacturers, vendors, and/or other interested/authorized parties (e.g., government agencies) to better understand both the micro and the macro security threats that are posed by externally connected controllers as well as the current security status (e.g., secure, under attack) of vehicles on the road. Such features can additionally permit for anomaly detection based prevention, such as through analyzing device measurements (e.g., CPU load, memory usage, I/O usage, etc.) that, by themselves, are not statistically significant, but when analyzed over time can indicate anomalies. For example, taking device measurements over time, average values (e.g., avg. CPU load, avg. memory usage, avg. I/O usage, etc.) can be determined, and when N>x, the standard deviation of the average is so small (e.g., alpha<0.00001) that it can serve as a base line for anomaly prevention and not just detection—meaning it can be accurate enough to block anomalies before/while they are occurring instead of after they have occurred.

In another example, endpoint controller security can permit detection that is much earlier than network-based solutions, which often are not able to detect that malware has compromised a controller until after the malware has had a chance to run. In contrast, endpoint security detects the malware before it has a chance to run on a controller, which not only prevents the malware from ever being executed but also determines that an operation is malware before it has been executed.

In a further example, endpoint security can readily be retrofitted for existing externally connected controllers that were not originally designed or manufactured with endpoint security in mind. This is possible through the automatic security policy generation features described above, which allow for security policies to be generated and readily deployed for controllers with little effort from manufacturers/vendors, and allow for endpoint security to be added to controllers through simple controller updates. Retrofitting can enhance security versions for existing vehicles on the road today, regardless of whether they were originally designed to include endpoint security.

In another example, rather than looking for hackers that are already in an IoT device/system's internal network (e.g., CAN Bus, internally-facing controllers), the disclosed technology can detect and stop an attack from getting into the internal network (e.g., CAN Bus, other controllers) in the first place. For example, the disclosed end-point solution can provide an early intrusion detection system that can protect externally connected controllers, which can allow for early intrusion detection and identification of threats targeting the IoT device/system and blocking exploits from infiltrating its internal components, which can ensure device/system and/or user safety.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1A:
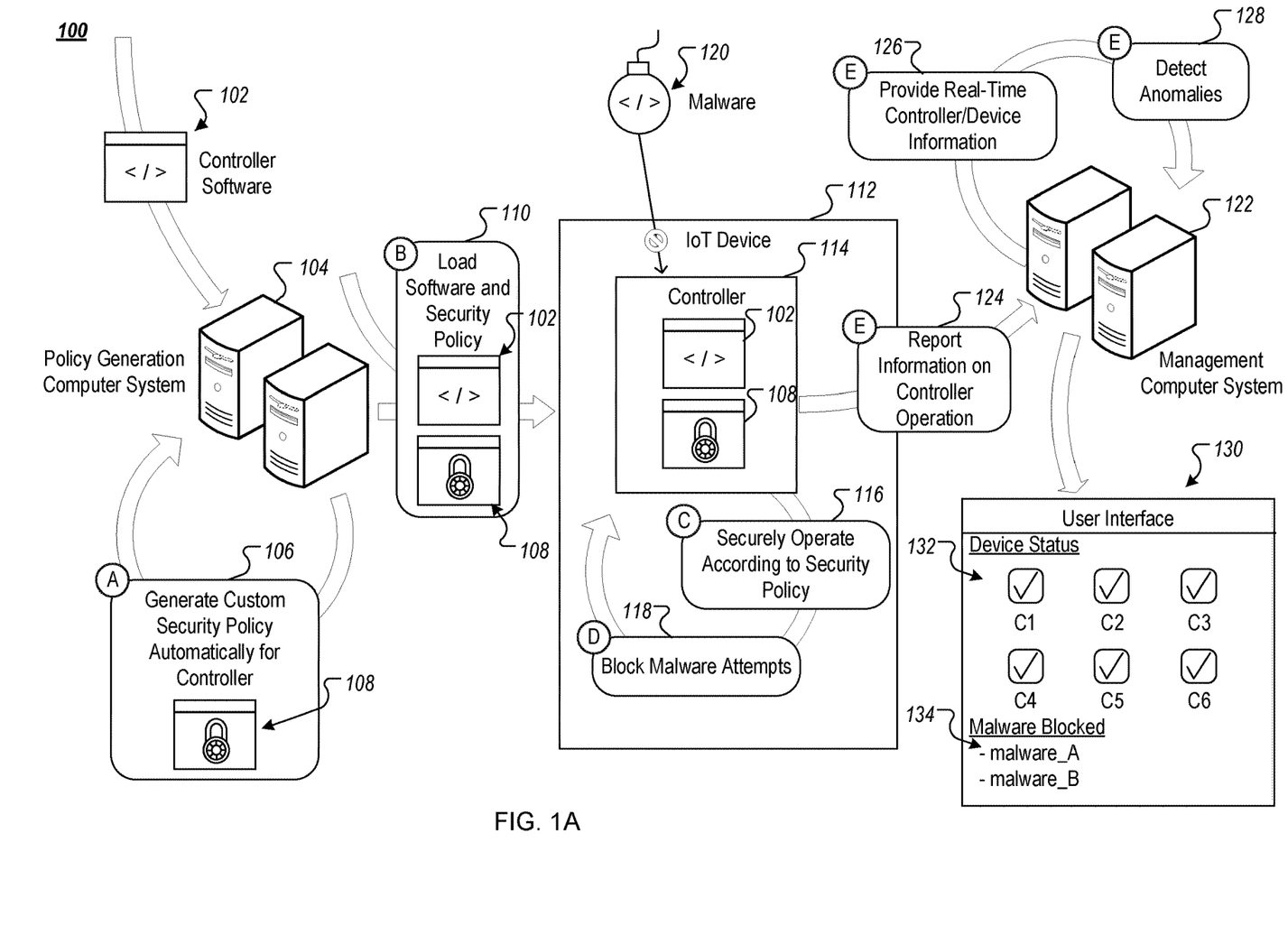
FIG. 1A is a conceptual diagram of an example system for generating and implementing a custom security policy on an example controller.

FIG. 1A is a conceptual diagram of an example system 100 for generating and implementing a custom security policy on an example controller. The example system 100 includes a policy generation computer system 104 (e.g., computer server system, cloud computing system, client computing device) that is programmed to automatically generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), wired networks, wireless networks, mobile data networks, or any combination thereof.

The policy generation computer system 104 can receive controller software 102, which can include an operating system and/or applications that are to be run on a controller. The controller software 102 can include binary code, for example, which can be disassembled (e.g., by the policy generation computer system 104) prior to being analyzed to generate a custom security policy. The policy generation computer system 104 can use the controller software to automatically generate a custom security policy 108 for the controller that is to execute the software 102, as indicated by step A (106). For example, the computer system 104 can analyze the software 102 to determine a set of operations and behaviors that are expected during operation of a controller according to the software 102, and can incorporate those operations and behaviors into the custom security policy 108, which may include one or more whitelists of permitted operations and/or behaviors. Generating the security policy can additionally include generating one or more signatures for components of the controller software 102, such as processes/functions that are part of the software 102, that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include whitelists (and other information) that designate authorized behaviors and operations for the controller 114 that are within expected behavior according to the controller software 102. Behaviors/operations that deviate from those authorized behaviors/operations can be prevented from occurring based on the security policy 108 hardening the controller 114 against such behaviors/operations.

For example, the controller software 102 can include one or more portions of code that make the controller 114 unsecure, which can potentially affect the security of not only the controller 114 but the device 112 (and other devices to which it is connected). As described above, security vulnerabilities can come in any of a variety of different types, such as buffer overrun vulnerabilities through which a hacker could potentially modify the software stack to cause malware 120 to be loaded onto and executed by the controller 114. By operating accordingly, the security policy 108 on the controller 114, such malware attempts can be blocked before the malware 120 is loaded/executed by the controller 114, as indicated by step D (118).

Such hardening of the controller 114—meaning restriction of the controller 114 to specific behaviors/operations outlined in the security policy 108—can provide endpoint security that provides an early intrusion detection system with a variety of benefits. For example, it can allow for early intrusion detection and warning of attacks by identifying attack attempts before they are able to install/run the malware 120 on the controller 114. It can also stop attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminates risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time. Traces of blocked malware attempts can include a variety of information, such as the malware itself, the origin of the malware (e.g., IP address from which the malware originated), and information identifying the code segment that provided the malware exploit. The controller 114 report information on controller operation, as indicated by step E (124). Such reporting can be provided in real-time. For example, the controller 114 can report malware traces in response to the malware 120 is attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers. The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a sequence of function calls that are a statistical outlier outside of the normal operation of a controller.

Figure 1B:
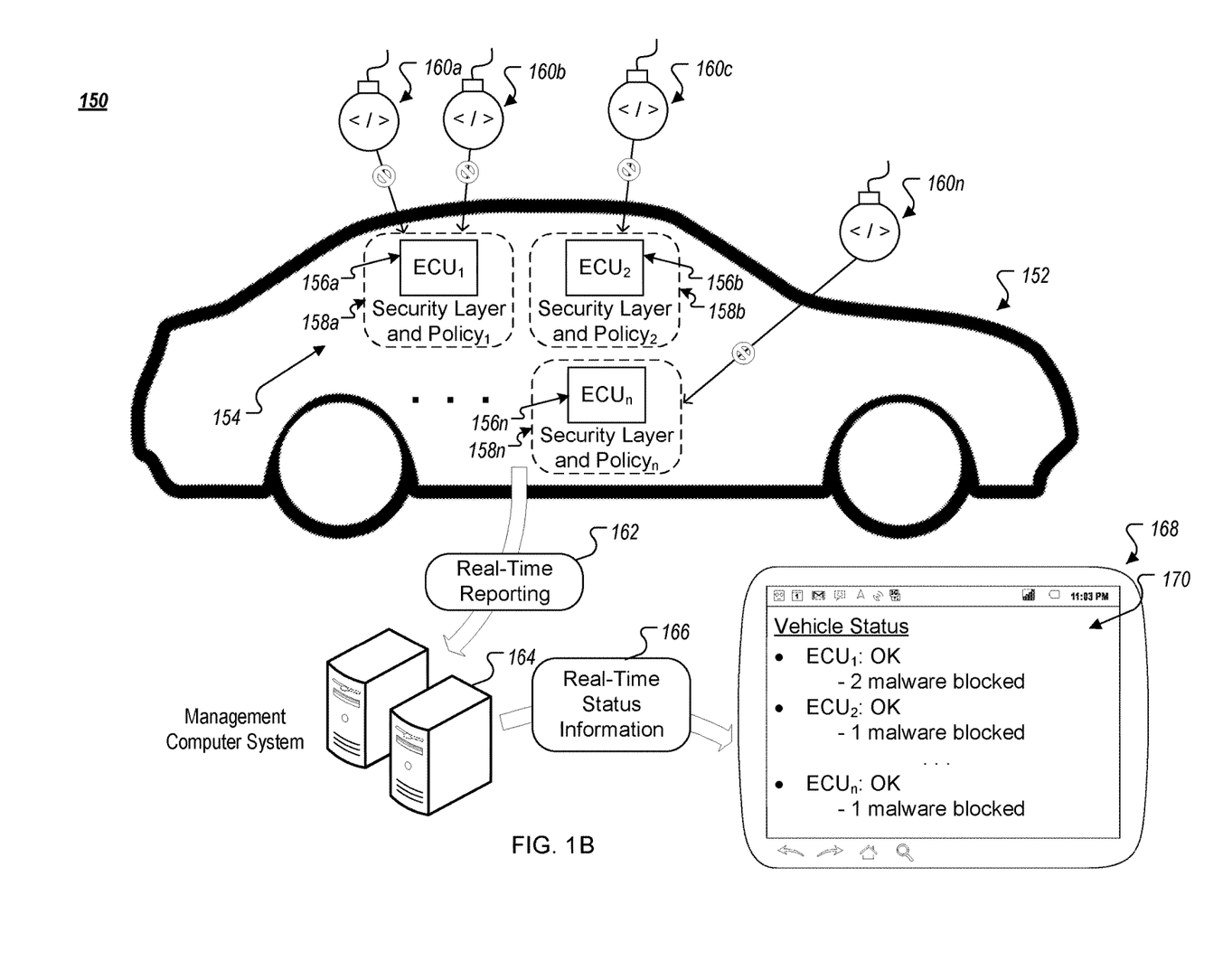
FIG. 1B is a conceptual diagram of an example system for implementing generating and implementing custom security policies on example ECUs that are part of an example vehicle.

FIG. 1B is a conceptual diagram of an example system 150 for implementing generating and implementing custom security policies on example ECUs that are part of an example vehicle 152. The example system 150 is an example implementation of the system 100 to a specific IoT context, which in this example is the vehicle 152. The system 100 and the system 150 can be implemented in a variety of other IoT contexts.

In this example, the vehicle 152 includes a control system 154 that includes multiple ECUs 156a-n that each have their own custom security policy 158a-n. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and behavior may run on it. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., the ECUs 156a-n are able to provide an early intrusion detection system capable of early detection of unexpected behavior or operation of a dropper (example intrusions) and immediately report on the attack attempt in real-time, as indicated by step 162. The early intrusion detection and warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source and path, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code and can be blocked when they attempts to run. For instance, such droppers and other hacker attempts are not part of the factory settings for the ECUs 156a-n, so they can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempt to run on the ECUs 156a-n, the endpoint security layer and policies 158a-n can detect it as foreign code and block its attempts to run.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security will be hardened against the cyber threats targeting them.

Figure 2:
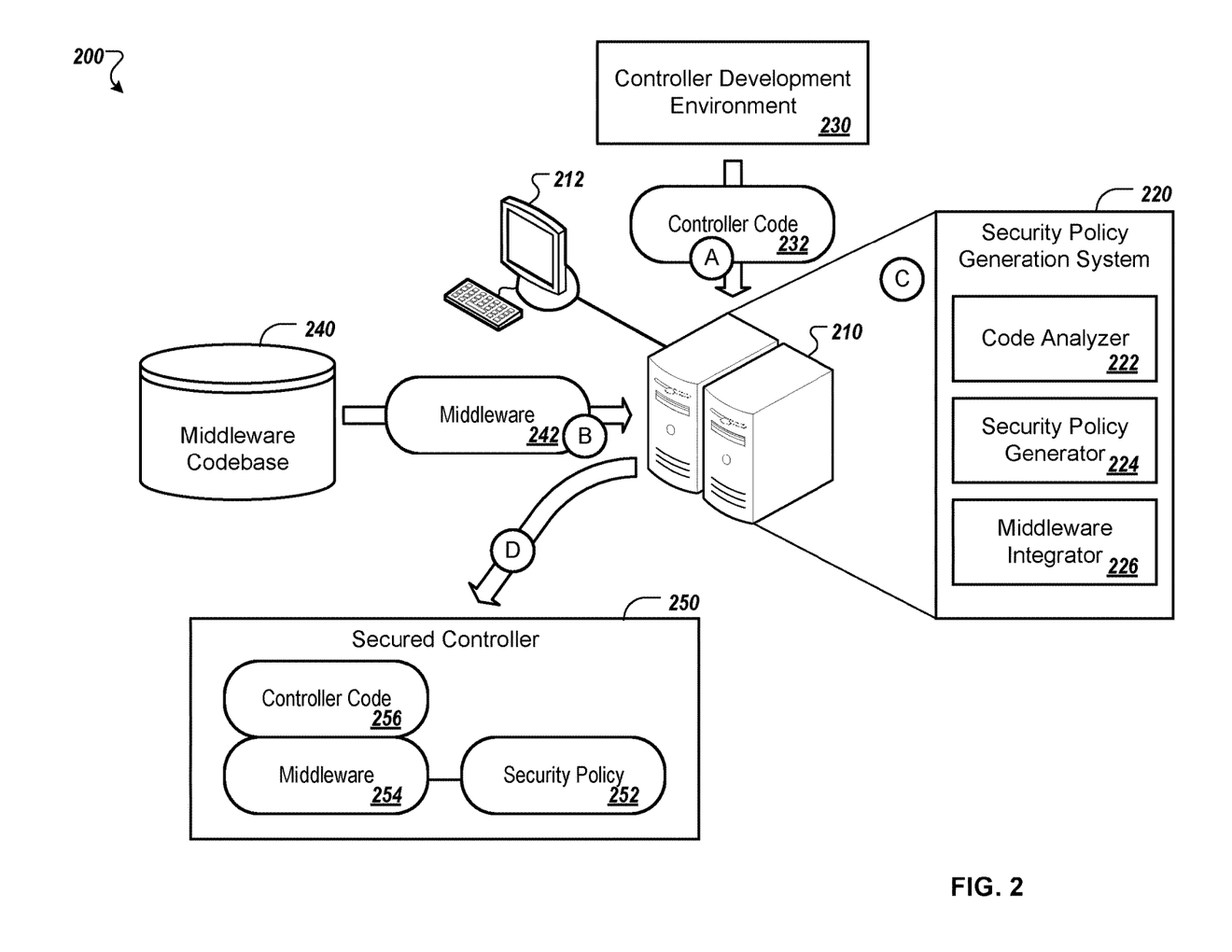
FIG. 2 is a diagram of an example system for generating security policies for controllers.

FIG. 2 is a diagram of an example system 200 for generating security policies for controllers. In general, ECU devices are manufactured in a factory, are burned with a software image, and do not change for a long time. When software updates are available, the software image goes through the entire QA cycle, exactly the same image is broadcasted to all the devices through secure channels, and their operation is expected to be similar. Moreover, ECU devices are set to implement a specific task, be it an electric street light or a vehicle powertrain ECU. They are not general purpose—to the contrary, their purpose is to function in a specific way. Thus, security layer can be generated for a controller to be product specific and tailor made.

For example, endpoint security can be added to externally connected ECUs (and in some instances, to internally connected ECUs) to protect from attacks. This can enable ECU and system providers to define factory settings for each ECU, generating a policy that creates whitelists of all ECU's permitted program binaries, processes, scripts, network behavior, and/or other devices. These policies can be embedded within the externally connected ECU to ensure only explicitly allowed code and behavior may run on it.

Endpoint ECU security layers can provide a variety of benefits, such as always providing security for the current version of the software in a car. The solution can be embedded in the development cycles of the controller; only when the controller is updated, the endpoint security layer is updated to reflect the new factory settings. Endpoint security layers can be retrofitted to existing ECUs on the market, as well. Recent attacks were performed on models that are already on the road. The FBI and U.S. National Highway Traffic Safety Administration (NHTSA) issued a public safety announcement that warned automobiles are increasingly vulnerable to exploits from cyber attackers. By adding ECU security layers to the software versions of externally connected ECUs, the car industry can retrofit and protect existing models against hackers. For example, endpoint security layers can be added as part of the regular software updates that drivers receive during regular maintenance and service checks. Once deployed, externally connected ECUs protected with endpoint security will be hardened against the cyber threats targeting them.

Endpoint security solutions can be used to protect both new and existing car models. Automobile manufacturers can retrofit the cars on the road now, for example, as part of the ECU software update when the car comes into the dealer for regular maintenance. Such endpoint security solutions are designed to be used by a variety of parties, such as car companies and tier-1 system providers, who build the car's externally connected controllers. For example, car companies don't want to tarnish their reputation, incur the costs of recalls, or lose future sales as the result of their vehicles being compromised. Tier-1 vendors also have their reputation and revenues to uphold; they are held accountable if the car is penetrated via their system. Both need a way to harden the controllers against attacks to ensure they cannot be used to get in and compromise the safety of the cars' drivers and passengers. The example system 200 permits for controllers to be readily implemented with security that will prevent security vulnerabilities for externally connected controllers.

As shown in FIG. 2, the example system 200 includes a security policy generation system 220. The security policy generation system 220, for example, can be implemented using one or more computer servers(s) 210. In some examples, the computing server(s) 210 can represent various forms of servers, including, but not limited to a network server, a web server, an application server, or a server farm. The computing server(s) 210 may be configured to execute application code associated with a variety of software components (e.g., modules, objects, libraries, services, etc.) and/or hardware components, including a code analyzer 222, a security policy generator 224, and a middleware integrator 226. Two or more of the components 222, 224, and 226 may be implemented on the same computing device, or on different devices, such as devices included in a computer network, a peer-to-peer network, or on a special purpose computer or special purpose processor. Operations performed by each of the components 222, 224, and 226 may be performed by a single computing device, or may be distributed to multiple devices.

The example system 200 can include one or more computing device(s) (e.g., computing device 212) employed by users for sending data to and receiving data from the security policy generation system 220. The computing device 212, for example, may be any suitable type of computing device (e.g., laptop or desktop computer, tablet computer, smartphone, personal digital assistant, or other stationary or portable device). Among other components, the computing device 212 can include one or more processors, computer readable media that store software applications, input device(s) (e.g., touch screens, keyboards, computer mice, motion sensors, microphones, etc.), output device(s) (e.g., display screens, speakers, etc.), and communications interfaces.

Various data sources (e.g., databases, file systems, etc.) may maintain data used by the example system 200 and its components. For example, the system 200 includes a middleware codebase 240, that can include code for generating a middleware layer (e.g., a module, driver, or another suitable software layer) that is configured to integrate with a particular operating system kernel. The middleware codebase 240, for example, can implement databases, file systems, and the like to add, remove, and maintain data used by the system 200.

FIG. 2 also shows an example flow of data within the system 200 during stages (A) to (D). The stages (A) to (D) may occur in the illustrated sequence, or they may occur in a sequence that is different than in the illustrated sequence. For example, two or more of the stages (A) to (D) may occur concurrently or in a different order. The example flow of data will be described here, and in further detail in connection with FIG. 5.

Referring to the example flow of data, during stage (A), the security policy generation system 220 can receive controller code 232 from a controller development environment 230. The controller development environment 230, for example, can be an integrated development environment (IDE) for developing a computer-based controller (e.g., an ECU). The controller code 232, for example, can be binary code, source code, compiled code, or another type of code. In some implementations, the security policy generation system 220 (and the middleware codebase 240) may be included in the controller development environment 230. In some implementations, binary code may be disassembled prior to being analyzed to automatically generate a custom security policy. For example, the received controller code 232 can be binary code, and the binary code can be disassembled by the security policy generation system 220 (e.g., using disassembly tools) to generate original code from the binary code. Thus, the controller code 232 received from the controller development environment 230 can be secured during transmission to the security policy generation system 220.

During stage (B), the security policy generation system 220 can receive middleware 242 from the middleware codebase 240. In some implementations, the middleware may be selected based on an operating system kernel intended for running received controller code. For example, the security policy generation system 220 can receive information related to a particular operating system kernel on which the received controller code 232 is to run, and middleware 242 corresponding to the particular operating system kernel can be selected from the middleware codebase 240 and provided to the security policy generation system 220.

During stage (C), the security policy generation system 220 can analyze the received controller code 232, can generate a security policy for the controller code 232, and can integrate the received middleware 242. Using the code analyzer 222, for example, the security policy generation system 220 can perform static and/or dynamic analysis on the received controller code 232 to identify valid execution paths, network resources, and ports referenced by the controller code 232. Based on the analysis, for example, the security policy generation system 220 can use the security policy generator 224 to generate an appropriate security policy (e.g., an encrypted, read-only file) for the computer-based controller. The security policy generation system 220 can use the middleware integrator 226 to integrate the received middleware 242 with the received controller code 232 and with the generated security policy.

During stage (D), the security policy generation system 220 can provide a secured controller 240. The secured controller 240, for example, includes controller code 256 (e.g., the controller code 232 received from the controller development environment 230), middleware 254 (e.g., the middleware 242 received from the middleware codebase 240) and a generated security policy 252 (e.g., the security policy generated by the security policy generation system 220 using the security policy generator 224). The controller code 256 remains unmodified, for example, and is kept separate from the middleware 242 and the security policy 252. In some implementations, the secured controller 250 may be generated and compiled by the security policy generation system 220. In some implementations, the controller code 256, middleware 254, and security policy 252 may be provided to the controller development environment 230 for integration and compiling by the controller development environment 230.

Figure 3:
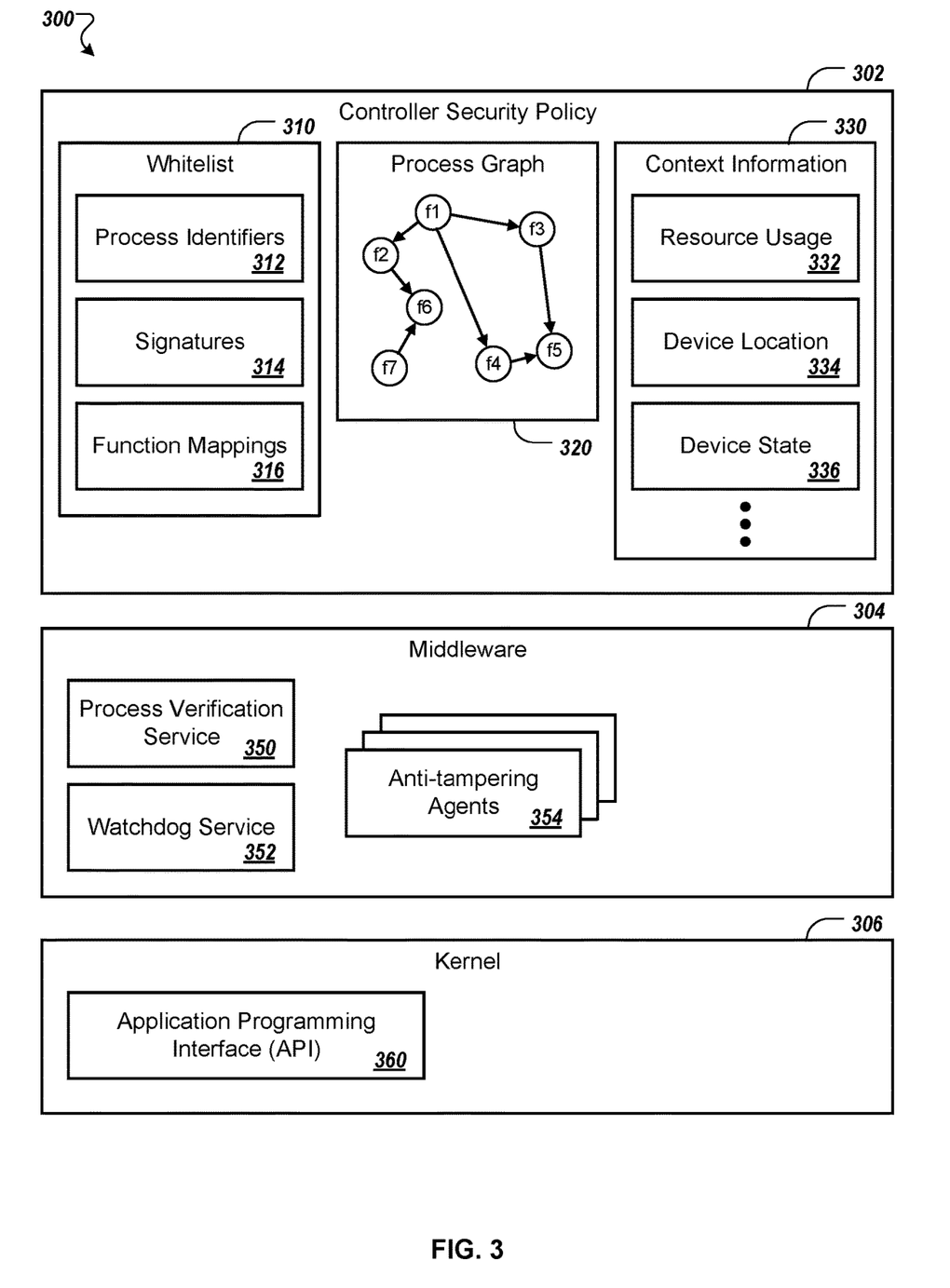
FIG. 3 is a diagram of an example structure of a secured controller.

FIG. 3 is a diagram of an example structure of a secured controller 300 (e.g., similar to the secured controller 250, shown in FIG. 2). In the present example, the secured controller 300 includes a controller security policy 302 (e.g., similar to the security policy 252, shown in FIG. 2) and middleware 304 (e.g., similar to the middleware 254, shown in FIG. 2), configured to be executed within a framework of a kernel 306 and its application programming interface (API) 360.

The controller security policy 302 includes a whitelist 310, a process graph 320, and context information 330. In some implementations, the controller security policy 302 can be included in an encrypted, read-only file. Referring to FIG. 2, for example, the security policy generator 224 can generate and encrypt the security policy 252, which can be maintained separately from the controller code 256 and the middleware 254.

In general, application whitelisting permits only preset, approved programs, binaries, scripts, functions, processes, etc. to be run by an ECU. Any attempt to launch foreign programs (unfamiliar scripts or malware) can be blocked instantaneously by the ECU. Referring again to FIG. 3, for example, the whitelist 310 includes process identifiers 312, signatures 314, and function mappings 316. After static analysis of the controller code 232 has been performed, for example, the security policy generator 224 (shown in FIG. 2) can designate an identifier and can generate a signature (e.g., SHA256 or another suitable hash function or signature function) for each of the processes implemented in the code. Additionally, the whitelist 310 can include function mappings 316 among the whitelisted processes/programs/binaries/scripts/etc. that can be referenced to determine whether operations being performed by the ECU are within the expected/known parameters and should be permitted or blocked.

In some implementations, the whitelist 310 can include policies related to network firewalls and/or ports. Network firewall policies, for example, can control which processes/services are granted external connectivity, and can control inbound and outbound permissions. A network firewall can additionally restrict access to specific ports and IP addresses, which can be for specific processes/services and/or for the ECU as a whole. Port protection policies, for example, can restrict any external devices that the ECU has, such as USB, to what they can be used for (e.g. run only media files, not allowing applications, etc.).

After static analysis of the controller code 232 has been performed, for example, the security policy generator 224 (shown in FIG. 2) can generate the process graph 320, which shows valid execution paths in the code. In the present example, the process graph 320 is a directed graph that represents calling relationships between procedures in the controller code 232, where each node represents a procedure and each edge indicates that one procedure calls another procedure.

In general, whitelists may be deterministic by nature, in the sense that a process can either be allowed to run or be blocked. However, some ECUs may benefit from considering context as a factor in determining whether to allow or to block a procedure call. For example, some ECU processes may be allowed to run when a device (e.g., a vehicle) is in a particular operational state (e.g., running), at a particular location (e.g., within range of another device), and/or if resource usage meets a threshold level, whereas the processes may not be allowed to run under different contextual circumstances. In the present example, the context information 330 includes information related to resource usage 332, device location 334, device state 336, and other suitable types of context information. After static analysis of the controller code 232 has been performed, for example, the security policy generator 224 (shown in FIG. 2) can add the context information 330 to the controller security policy 302.

The middleware 304 includes a process verification service 350, a watchdog service 352, and anti-tampering agents 354. Each of the process verification service 350, the watchdog service 352, and the redundant agents can include modules, drivers, or other suitable software components that are configured to integrate with the application programming interface 360 of the kernel 306.

The process verification service 350, for example, can integrate with process loading and file access services of the kernel 306. For example, every time a process of a secured controller is loaded, the loaded process can be identified, and the loaded process's signature (e.g., SHA 256 signature) can be calculated (e.g., based on its binary code) and compared to the corresponding signature 314 maintained in the whitelist 310. If the loaded process's calculated signature matches the process signature 314 from the whitelist 310, for example, the process can be approved and allowed to run on the ECU without interference. If a loaded process's signature does not match the process signature 314 from the whitelist 310, for example, the process can be denied and appropriate measures can be performed (e.g., the process can be aborted and an audit log entry can be written).

In some implementations, a network firewall can be integrated into a socket layer (or equivalent) of the kernel 306. The network firewall can apply a network policy to control inbound and outbound connections for secured controller 300, for example. Inbound rules can specify allowed ports (e.g., port 80) and source IP addresses for selected system processes. Outbound rules can define specific ports and destination IP addresses for selected system processes.

In some implementations, devices that include physical access ports, such as USB and OBD, can implement a peripheral port protection policy, which can include various rules. For example, peripheral device file access can be limited to specific file types (e.g. media files) for the secured controller 300. As another example, running object files from an unidentified source can be prevented for the secured controller 300. These rules can enable safe usage of peripheral devices, such as through sharing photos and videos, and/or running software updates from a peripheral device, only if the device is identified/authorized as a legitimate/permitted peripheral device by a manufacturer/vendor.

In some implementations, the process verification service 350 can perform a process sequence check before determining whether to approve or deny a process. For example, during runtime, the process verification service 350 can verify that the sequence of calls in the software stack appears in the process graph 320 as a valid sequence. If the sequence of calls is valid, for example, the process can be approved and allowed to run on the ECU without interference. If the sequence of calls is not valid, for example, it may be an indication that malware is causing the CPU to run unauthorized code—thus, the process can be denied and appropriate measures can be performed.

In some implementations, the process verification service 350 can perform one or more contextual checks before determining whether to approve or deny a process. For example, if a current context (e.g., resource usage, device location, and/or device state) matches an expected context for execution of a loaded process (e.g., based on the context information 330 maintained for the process in the controller security policy 302), the process can be approved and allowed to run on the ECU without interference. If a current context does not match an expected context for execution of the loaded process, for example, the process can be denied and appropriate measures can be performed.

The watchdog service 352 of the middleware 304 can prevent attempts to circumvent the controller security policy 302. For example, the kernel 306 can first load the watchdog service 352 that continuously monitors an implementation of the controller security policy (e.g., security policy files, OS hooks for whitelisted processes, network firewalls, peripheral port protection policies), and prevents an attacker from removing policy enforcement at runtime. In the event that a hook has been removed or that a portion of the policy has somehow been removed/disabled, for example, the watchdog service 352 can send an alert, which can cause any of a variety of actions to occur (e.g., notify an operator, notify a vendor/manufacturer, restart/reset an ECU).

In some implementations, the middleware 304 may include multiple anti-tampering agents 354 that run concurrently and that each check each other in addition to the watchdog service 352, the controller security policy 302, and its enforcement, so that if one of the anti-tampering agents 354 is compromised there is redundancy to identify threats.

Figure 4:
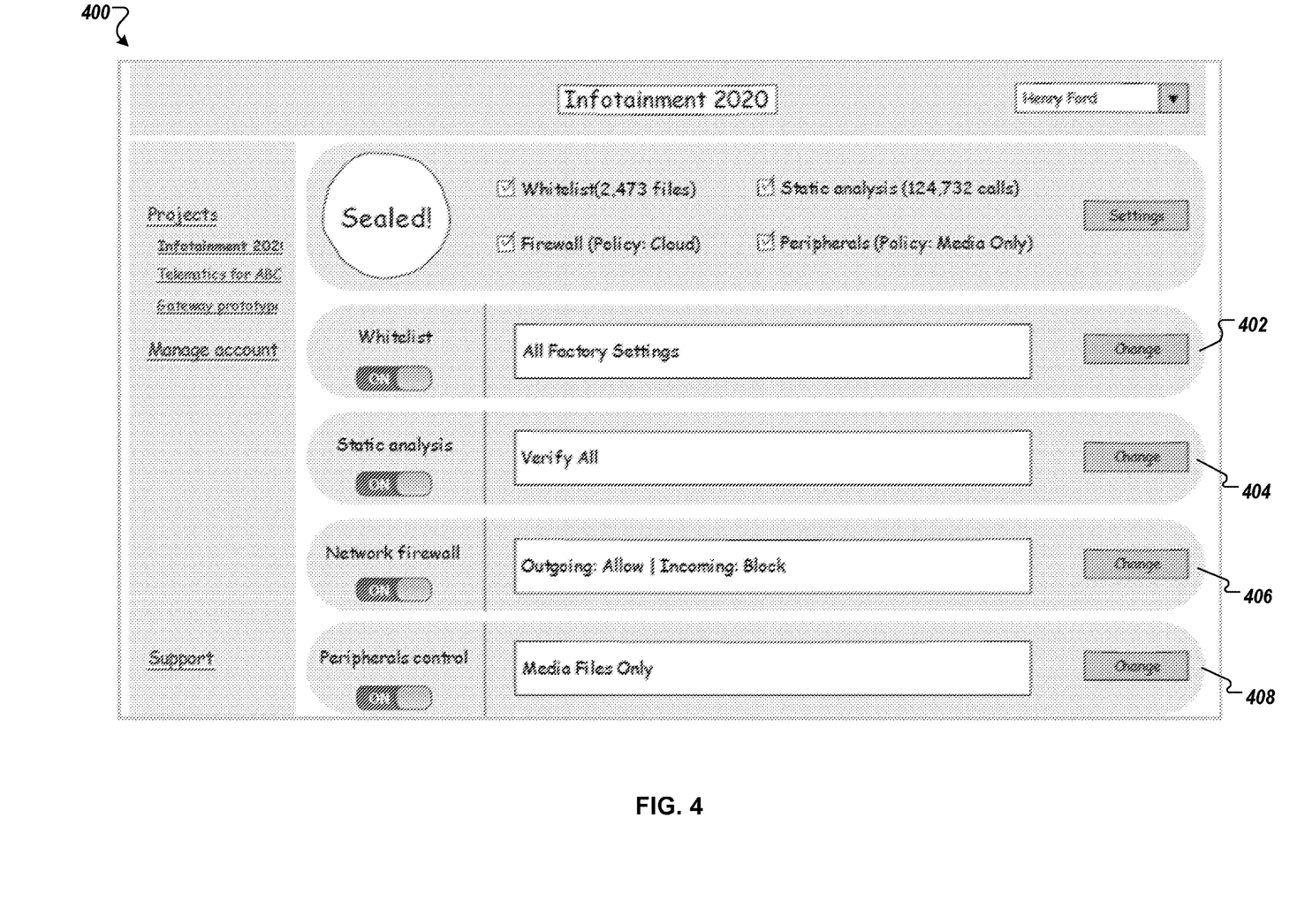
FIG. 4 depicts an example interface for generating security policies for controllers.

FIG. 4 depicts an example interface 400 for generating security policies for controllers. Referring to FIG. 2, for example, the example interface 400 can be presented by the computing device 212 and can be used to initiate the generation of a security policy for a controller by the security policy generation system 220. In the present example, the interface 400 includes a set of controls for configuring a security policy, including a control 402 for specifying one or more parameters for generating a whitelist, a control 404 for specifying one or more parameters for performing static analysis (e.g., by the code analyzer 222, shown in FIG. 2), a control 406 for specifying one or more parameters for configuring a network firewall, and a control 408 for specifying one or more parameters for specifying a peripheral port protection policy. Based on user interaction with the controls 402, 404, 406, and 408, for example, the security policy generator 224 (shown in FIG. 2) can generate a customized security policy for a secured controller (e.g., the secured controller 250).

Figure 5:
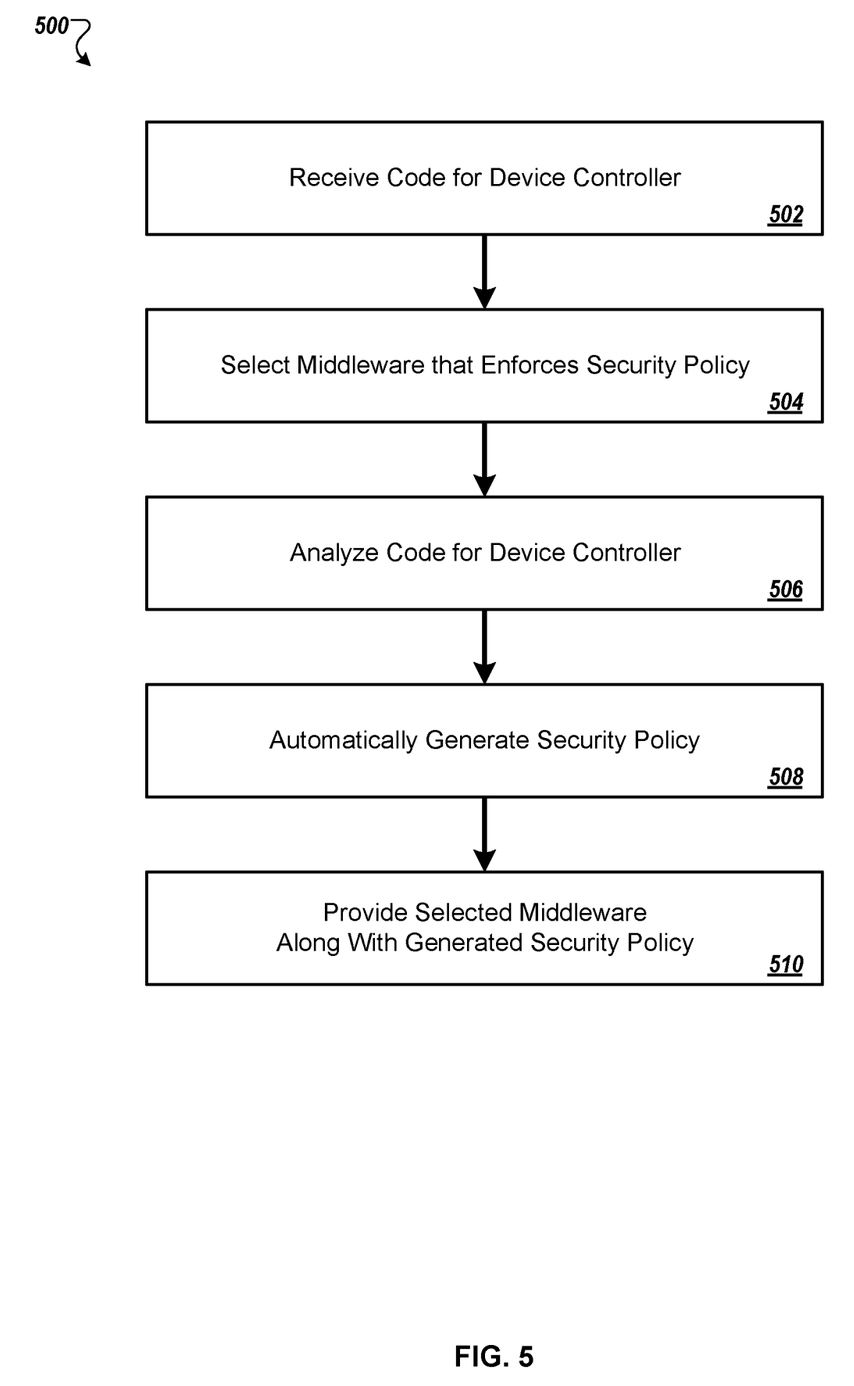
FIG. 5 depicts an example process for generating security policies for controllers.

FIG. 5 depicts an example process 500 for generating security policies for controllers. In general, the example process 500 can be used to provide a generated security policy, along with selected middleware for enforcing the generated security policy. The example process 500 can be implemented, for example, by the system 200, and will be described as such for clarity.

Code for a device controller can be received (502). For example, the security policy generation system 220 can receive the controller code 232 from the controller development environment 230. The received controller code 232 can include binary code, for example, which can be disassembled by the security policy generation system 220 (e.g., using disassembly tools) to generate original, analyzable code from which a custom security policy can be generated for the controller.

Middleware that enforces a security policy can be selected (504). In some implementations, an operating system kernel configured to execute the code for the device controller can be identified, and the middleware for enforcing the security policy can be selected based on its compatibility with the identified operating system kernel. For example, the security policy generation system 220 can select the middleware 242 that is compatible with an operating system kernel that executes the controller code 232. In some implementations, the middleware for enforcing the security policy can include a process verification service, a watchdog service, and at least one anti-tampering agent configured to monitor the security policy and the watchdog service. Referring to FIG. 3, for example, the middleware 304 includes the process verification service 350, the watchdog service 352, and multiple anti-tampering agents 354 that are configured to run on the kernel 306.

The code for the device controller can be analyzed (506). Analyzing the code for the device controller can include static analysis. For example, the security policy generation system 220 can use the code analyzer 222 to examine the controller code 232 without executing the code, to identify processes included in the code, to identify network access and peripheral access by the code, and to generate a process graph for the code.

Based at least in part on the analyzing, the security policy can be automatically generated (508). For example, the security policy generation system 220 can use the security policy generator 224 to generate the security policy 252. Automatically generating the security policy can include generating a signature for each process of the code for the device controller, and adding the signature to a whitelist portion of the security policy. Automatically generating the security policy can include generating a process graph that identifies valid execution paths within the code for the device controller, and adding the process graph to the security policy. Automatically generating the security policy can include adding to the security policy, context information for at least one process of the code for the device controller. The security policy can be included in an encrypted, read-only file. Referring again to FIG. 3, for example, the controller security policy 302 includes a whitelist 310 with signatures 314 for each process, a process graph 320, and context information 330 for one or more selected processes.

In some implementations, generating a security policy can include removing unnecessary applications or system services. For example, the Linux '1s' command may be removed, since it is used to list files on disk, but is not typically needed in production environments. By blocking such additional services (e.g., 1s command) that are used, for example, to research and develop a device controller, hackers' abilities to identify controller vulnerabilities may be reduced.

The selected middleware can be provided along with the generated security policy (510). For example, the security policy generation system 220 can use the middleware integrator 226 to provide the middleware 254 and the security policy 252. In general, the code for the device controller can remain unmodified, and can remain distinct from the security policy and the middleware that enforces the security policy. In some implementations, a secured device controller can be generated that includes the code for the device controller, the security policy, and the middleware that enforces the security policy. For example, the secured controller 250 includes the controller code 256, the middleware 254, and the security policy 252.

Figure 6:
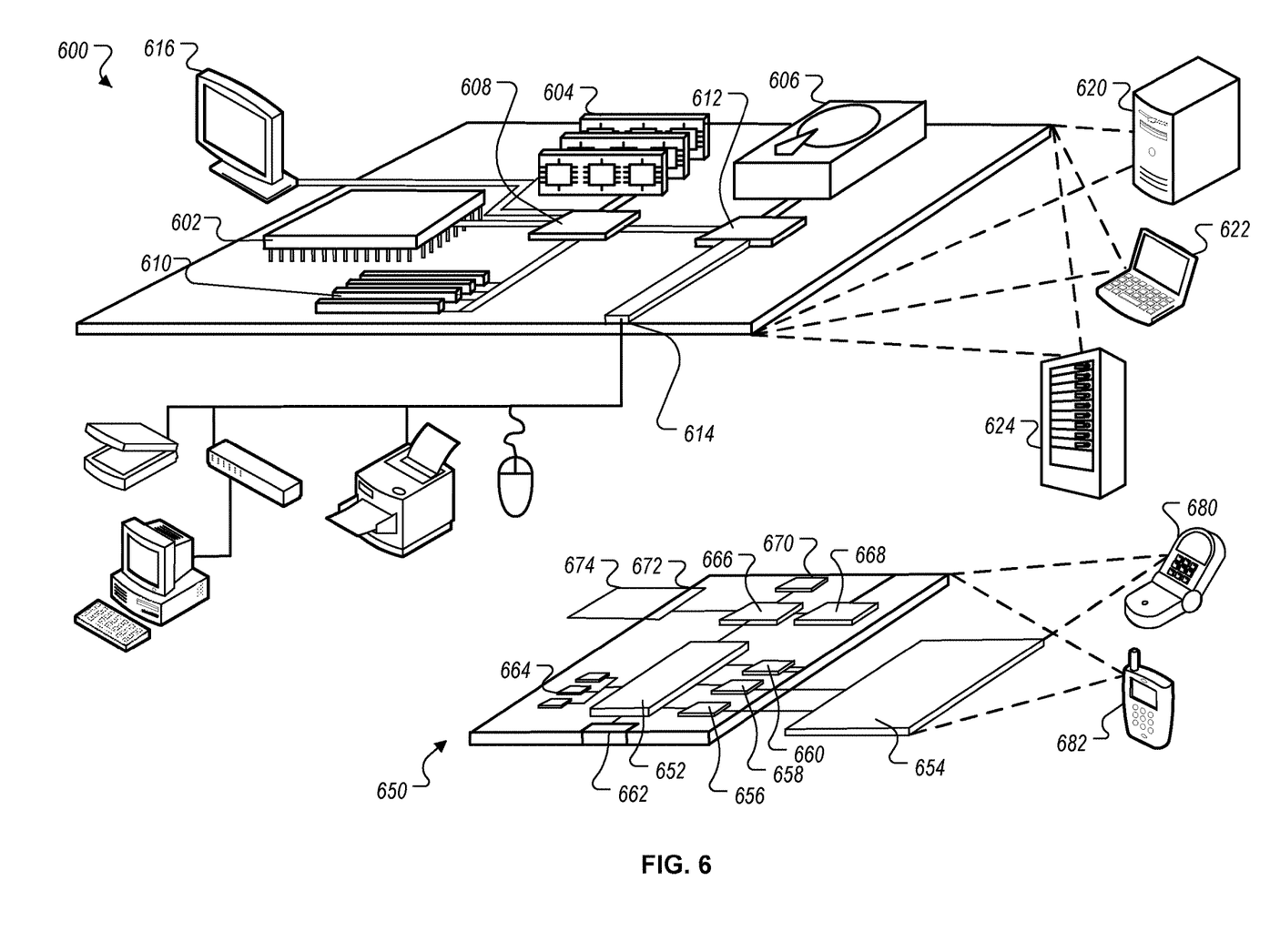
FIG. 6 is a block diagram of example computing devices.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processors embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provided as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing security on connected controllers, the method comprising:
   receiving, at a server system, controller software associated with a plurality of controllers that are separate from the server system, the controller software comprising controller code;
   analyzing the controller code to generate one or more security policies for the plurality of controllers;
   deploying the one or more security policies to the plurality of controllers, wherein the plurality of controllers implement the one or more security policies; and
   receiving, at the server system, operation information from the plurality of controllers that are implementing the one or more security policies, the plurality of controllers being installed across a plurality of devices.

2. The method of claim 1, wherein the plurality of controllers are configured to implement the one or more security policies using a security middleware layer.

3. The method of claim 1, further comprising generating a report based on the received operation information and configured to be presented at a device-specific view, a manufacturer-specific view, or an industry-specific view.

4. The method of claim 1, further comprising generating a report based on the received operation information and including state information of the plurality of devices.

5. The method of claim 1, further comprising generating a report based on the received operation information and including information anonymized and aggregated from the plurality of controllers.

6. The method of claim 1, further comprising:
generating a report based on the received operation information, the operation information being lodged by the plurality of controllers over time; and
providing the report at a user interface.

7. The method of claim 1, wherein the plurality of controllers are configured to delay providing the operation information based on an amount of processing capacity or available bandwidth.

8. The method of claim 1, wherein the operation information comprises at least one trace of blocked malware.

9. The method of claim 8, wherein the at least one trace of blocked malware comprises at least one of: malware code, an origin of the blocked malware, or information identifying a controller code segment that provided an exploit for the blocked malware.

10. The method of claim 1, further comprising detecting an anomaly of at least one of the plurality of controllers based on the received operation information.

11. The method of claim 10, wherein detecting the anomaly of the at least one controller comprises analyzing device measurements taken over a period of time to identify at least one behavior of the at least one controller that is outside of normal controller operation.

12. The method of claim 11, wherein the at least one behavior is associated with at least one of: a CPU load, a memory usage, or an input/output (I/O) usage.

13. The method of claim 1, wherein the controller code is disassembled prior to the analysis.

14. The method of claim 1, wherein the security policy restricts at least one of the plurality of controllers to a specific behavior or operation defined in the security policy.

15. The method of claim 1, wherein the security policy restricts at least one of the plurality of controllers to operate with specific code or a specific application defined by the security policy.

16. The method of claim 1, wherein the security policy comprises a whitelist of at least one of: permitted program binaries, permitted processes, permitted scripts, permitted network behavior, or permitted devices.

17. The method of claim 1, further comprising receiving operating system information associated with the received controller software, wherein the generated one or more security policies are based on the received operating system information.

18. The method of claim 1, wherein analyzing the controller code to generate one or more security policies for the plurality of controllers comprises performing at least one of: static or dynamic analysis for the received controller code.

19. The method of claim 18, wherein the static or dynamic analysis identifies at least one of: a valid execution path, a network resource, or a port referenced by the controller code.

20. A non-transitory computer readable medium including instructions that, when executed by at least one processor, cause the at least one processor to perform operations for providing security on connected controllers, comprising:
receiving, at a server system, controller software associated with a plurality of controllers that are separate from the server system, the controller software comprising controller code;
analyzing the controller code to generate one or more security policies for the plurality of controllers;
deploying the one or more security policies to the plurality of controllers, wherein the plurality of controllers implement the one or more security policies; and
receiving, at the server system, operation information from the plurality of controllers that are implementing the one or more security policies, the plurality of controllers being installed across a plurality of devices.

* * * * *

UNITED STATES PATENT AND TRADEMARK OFFICE
CERTIFICATE OF CORRECTION

| | | |
|---|---|---|
| PATENT NO. | : 11,509,666 B2 | Page 1 of 1 |
| APPLICATION NO. | : 17/073470 | |
| DATED | : November 22, 2022 | |
| INVENTOR(S) | : Tal Efraim Ben David et al. | |

It is certified that error appears in the above-identified patent and that said Letters Patent is hereby corrected as shown below:

On the Title Page

Item (12), "David et al." should read --Ben David et al.--.

In the Claims

Claim 6, Column 21, Line 14, "operation information being lodged" should read --operation information being logged--.

Signed and Sealed this
Twenty-second Day of August, 2023

Katherine Kelly Vidal
*Director of the United States Patent and Trademark Office*